United States Patent Office 2,870,172

Patented Jan. 20, 1959

1

2,870,172

PIGMENT DYESTUFFS OF THE ANTHRAQUINONE SERIES

Wolfgang Schoenauer, Riehen, Switzerland, assignor to Sandoz A. G., Basel, Switzerland, a Swiss firm No Drawing. Application November 13, 1956
Serial No. 621,548

Claims priority, application Switzerland November 18, 1955

7 Claims. (Cl. 260—368)

The present invention relates to new valuable pigment dyestuffs of the anthraquinone series which correspond to the general formula

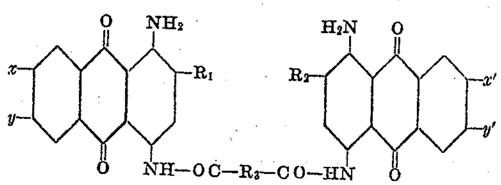

In this formula:

Each of $x$ and $x'$ stands for hydrogen, fluorine, chlorine or bromine,
Each of $y$ and $y'$ stands for hydrogen, fluorine, chlorine or bromine,
Each of $R_1$ and $R_2$ stands for hydrogen, chlorine, bromine, an alkoxy radical containing 1 to 3 carbon atoms, a mononuclear aryloxy, or a mononuclear arylsulfonyl radical which may bear non-ionic substituents, and
$R_3$ stands for the single carbon linkage, the bivalent radical of a saturated or unsaturated lower aliphatic hydrocarbon or the bivalent radical of a mononuclear or of a binuclear aromatic hydrocarbon.

The said radicals may contain non-ionic substituents and, in the case of the binuclear aromatic radicals, the nuclei are combined with each other either directly or through bridge members.

These new pigment dyestuffs of the anthraquinone series are obtained when 2 mols of a 1.4-diaminoanthraquinone of the general formula

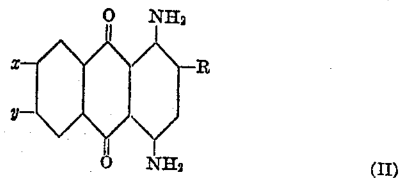

wherein:

$x$ stands for hydrogen, fluorine, chlorine or bromine,
$y$ stands for hydrogen, fluorine, chlorine or bromine, and
R stands for hydrogen, chlorine, bromine, an alkoxy radical containing 1 to 3 carbon atoms, or an aryloxy or arylsulfonyl radical, which may bear non-ionic substituents, or 2 mols of a mixture in any desired proportions of two 1.4-diaminoanthraquinones of this type are reacted with 1 mol of a saturated or unsaturated aliphatic, or a mono- or binuclear aromatic dicarboxylic acid halide which may contain non-ionic substituents. In the case of binuclear aromatic dicarboxylic acid halides, the nuclei are combined with each other either directly or through bridge-members. The resulting condensation products undergo further processing to give pigment dyestuffs.

2

Of special interest are pigment dyestuffs corresponding to the Formula I, wherein Each of $x$, $x'$, $y$ and $y'$ stands for hydrogen or chlorine,
Each of $R_1$ and $R_2$ stands for bromine or methoxy, and
$R_3$ stands for the single carbon linkage, the bivalent methylene radical, a bivalent tetramethylene radical or a bivalent phenylene radical.

The most valuable pigment dyestuffs however are those which correspond to the formula

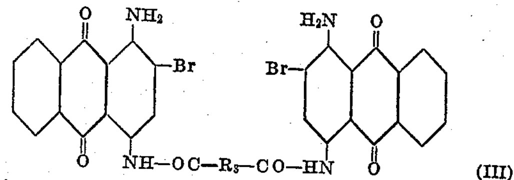

wherein $R_3$ stands for the single carbon linkage, the bivalent methylene radical, a bivalent tetramethylene radical or a bivalent phenylene radical.

According to the process described above mixtures of pigment dyestuffs of the anthraquinone series are obtained when two 1.4-diaminoanthraquinones of the same general Formula II but different from each other are condensed with the dicarboxylic acid halides defined above. These mixtures are very useful for obtaining any desired shade in the range of bordeaux to violet.

The following 1.4-diaminoanthraquinones are enumerated as examples of those suitable for the formation of the new pigment dyestuffs of the anthraquinone series: 1.4-diaminoanthraquinone, 1.4-diamino-2-chloroanthraquinone, 1.4-diamino-2-bromanthraquinone and the 1.4-diaminoanthraquinones of the general formulae

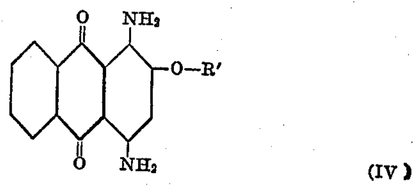

and

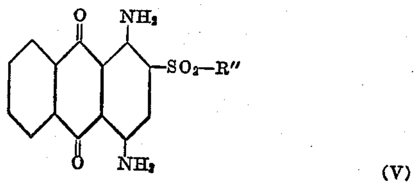

wherein:

R′ stands for an alkyl radical containing 1 to 3 carbon atoms or a phenyl radical, and
R″ for a phenyl, a methylphenyl or a chlorophenyl radical.

Water-solubilizing substituents, e. g. sulfonic acid, carboxylic acid and hydroxy groups, are outside the scope of this definition.

Examples of dicarboxylic acid halides which may be considered for the present purpose are oxalic acid dichloride, malonic acid dichloride, succinic acid dichloride, bromosuccinic acid dichloride, glutaric acid dichloride, methylglutaric acid dichloride, adipic acid dichloride, dichloroadipic acid dichloride, methyladipic acid dichloride, sebacic acid dichloride, fumaric acid dichloride, muconic acid dichloride, isophthalic acid dichloride, chloroisophthalic acid dichloride, terephthalic acid dichloride, chloroterephthalic acid dichloride, 1.1′-azobenzene-4.4′-dicarboxylic acid chloride, 1.1′-diphenyl-3.3′-dicarboxylic acid chloride, 1.1′-diphenyl-4.4′-dicarboxylic acid chloride, 1.1′diphenylmethane-4.4′-dicarboxylic acid chloride.

The acylation of the 1.4-diaminoanthraquinones conforming to the present definition is accomplished by exposing them to the action of dicarboxylic acid chlorides in stoichiometric ratio. The dicarboxylic acid halides may be added to the solution or suspensions as such or, more advantageously, in the form of solutions in organic solvents. Alternatively, they may be produced in the reaction mass from the corresponding dicarboxylic acids by reaction, for example with thionyl chloride. Acylation is conducted preferably in an organic medium, if desired in presence of an acid-binding agent such as pyridine or dimethylaminobenzene, and at temperatures ranging from 50° to 180° C. It is advisable to eliminate the hydrogen halide liberated in the course of the reaction from the condensation mass, e. g. by directing air or an inert gas over the surface. The dicarboxylic acid anthraquinonylamides thus formed are usually precipitated from the condensation mass while it is still hot; they are filtered off at 60–100° C., washed with an alcohol and again with hot water, and then dried. They can be brought into a suitable state of division for further processing as pigment dyestuffs by precipitation from concentrated sulfuric acid or by grinding.

The pigment dyestuffs are best converted into commercial paste form in suitable equipment such as roller mills, ball mills or homogenizers, if desired with the addition of dispersing agents, e. g. condensation products of naphthalene sulfonic acids and formaldehyde. The processed pigment dyestuffs may also be obtained in powder form by subjecting the pastes to a suitable drying process, for example drying, and re-grinding the dry powder in a suitable mill if desired.

The new pigment dyestuffs of the anthraquinone series are employed for dyeing paper pulp and man-made fibers in the spinning mass, for printing textiles and paper, and for pigmenting synthetic resins, molded plastics, lacquers, emulsion paints, etc. They are characterized by their outstanding light fastness in these materials, and have the advantage over monocarboxylic acid anthraquinonylamides of being insoluble in organic solvents.

The following examples illustrate the invention but do not circumscribe its possible scope. All parts and percentages specified therein are by weight; the temperatures are given in degrees centigrade.

EXAMPLE I 23.8 parts of 1.4-diaminoanthraquinone in 660 parts of dry 1.2-dichlorobenzene are heated to 110°. To the resulting solution at the same temperature are added 10 parts of dry pyridine, followed by a solution of 10.15 parts of benzene-1.3-dicarboxylic acid chloride in 29 parts of dry 1.2-dichlorobenzene, this being added dropwise in the course of 1½ to 2 hours. The mass is stirred for 1 hour at 110°, after which time the temperature is raised slowly to 135–140°. As soon as the starting material is no longer indicated, the reaction mass is allowed to cool. The precipitated condensation product is then filtered off, washed successively with 1.2-dichlorobenzene, hot alcohol, and water, and finally dried.

15 parts of the product thus obtained are added to a five to ten times greater quantity of 97–100% sulfuric acid or 1–3% oleum. The suspension, at 0–5°, is stirred until the contents are dissolved, and the solution is then poured in a fine jet into 2000–3000 parts of ice water with vigorous stirring. The temperature of precipitation should not exceed 20°. The precipitated pigment dyestuff is filtered off, washed in neutral water, and if desired is treated with a dilute aqueous solution of sodium hydroxide or sodium carbonate to completely remove the adherent sulfuric acid. Following this it is again suction-filtered and washed in neutral water. The dried pigment dyestuff is a powder which dissolves in sulfuric acid with a red coloration.

In order to convert the pigment dyestuff into a commercially usable form the filter cake, after neutral washing, is compounded with the sodium salt of dinaphthylmethane disulfonic acid in suitable apparatus such as a roller mill, ball mill or homogenizer until the desired particle size is obtained. In this form the pigment dyestuff is ready for immediate use in textile printing, the dyeing of paper pulp in the beater and of viscose rayon in the spinning solution. In these applications it yields bright violet shades with good fastness properties. The paste may also be worked up to a pigment powder in suitable drying equipment such as a spray drier.

A paste composed of 100 parts of a 20% aqueous paste of the pigment dyestuff obtained according to the above example, 400 parts of tragacanth 3%, 400 parts of a 50% aqueous solution of egg albumin and 100 parts of a nonionic wetting agent are printed on a fabric of textile fiber. The print is dried and then steamed for 30 minutes at 100–101°.

In place of tragacanth and egg albumin the printing paste may be prepared with binders of the type used for fixing pigments to the fiber, for example those based on synthetic resins.

EXAMPLE 2

When the benzene-1.3-dicarboxylic acid chloride in Example 1 is replaced by benzene-1.4-dicarboxylic acid chloride, a pigment dyestuff is obtained which dyes viscose rayon in red-violet shades.

EXAMPLE 3

31.7 parts of 1.4-diamino-2-bromoanthraquinone in 660 parts of chlorobenzene are heated to the boil. The solution is dehydrated by distilling off 50 parts of a chlorobenzene-water mixture and is then drop-fed in the course of 1 to 1½ hours with a solution of 7.65 parts of fumaric acid dichloride in 28 parts of chlorobenzene. The reaction mass is stirred for 1 hour at 115–120° and after this time is heated for 1 hour at 130°. It is then allowed to cool to 80°, whereupon the condensation product is filtered off and washed, first with warm chlorobenzene, then with hot alcohol and finally with hot water, and subsequently dried.

The pigment dyestuff, of which a very good yield is obtained, dissolves in sulfuric acid with a red coloration. It can be converted into a pigment dyestuff preparation of suitable particle size by grinding in a ball mill in the presence of water and a dispersing agent, e. g. the condensation product of naphthalene sulfonic acid and formaldehyde. This preparation dyes viscose in the spinning solution in bordeaux shades.

A paper dyeing of medium depth can be produced in the beater by mixing 2 parts of a 10% aqueous paste of the pigment dyestuff of this example into a pulp of 100 parts of bleached sulfite cellulose and 2000 parts of water. Vegetable sizing and simultaneous fixation of the pigment dyestuff on the paper fiber are effected by the successive addition of 40 parts of a 2.5% gum rosin size and 40 parts of a 5% solution of aluminum sulfate.

EXAMPLE 4

When 6.4 parts of oxalic acid dichloride are employed in place of the fumaric acid dichloride specified in Example 3 a condensation product is obtained which dissolves in sulfuric acid with an orange-red coloration and gives a somewhat redder pigment dyestuff.

A colored emulsion paint is prepared as follows: 100 parts of a commercially available white emulsion paint (e. g. "Discovin," registered trademark) are weighed out. 5 parts of a 20% aqueous paste of the above-described dyestuff are stirred into it with a brush or suitable agitator until a homogeneous mixture is obtained. The finished paint is applied to wood, paper, etc. with a brush.

EXAMPLE 5

63.4 parts of 1.4-diamino-2-bromoanthraquinone in 1100 parts of nitrobenzene are heated to 140° and dehydrated by a current of dry air. The solution, at 110–115°, is drop-fed over a period of 2 hours with a solution of 20.3 parts of benzene-1.3-dicarboxylic acid chloride in 48 parts of nitrobenzene. The reaction mass is stirred for consecutive one-hour periods at 110–115°, 130° and 140°. The condensation product is filtered off at 80° and washed, first with nitrobenzene at 80°, then with hot alcohol and finally with hot water. It dissolves in sulfuric acid with a red coloration; when the solution is run into water at 50–60° the pigment dyestuff is obtained in finely divided form.

100 parts of a 20% aqueous paste of the pigment dyestuff obtained according to the present example are added to 22,500 parts of an aqueous solution containing approximately 9% of viscose in a mixing vessel equipped with an agitator. The dyed viscose spinning solution is stirred for 15 minutes and is then de-aerated and subjected to the normal spinning and desulfurizing processes. The viscose rayon thus obtained is dyed in reddish violet shades.

EXAMPLE 6

31.7 parts of 1.4-diamino-2-bromoanthraquinone in 660 parts of 1.2-dichlorobenzene are heated to 140° and dehydrated at this temperature by means of a dry air current. To the resulting solution at 110–115° small portions of benzene-1.4-dicarboxylic acid chloride totalling 10.3 parts are added over about 2 hours and the reaction mass stirred at 130–140° until such time as the starting material is no longer indicated. The condensation product thus formed is filtered off at 80°. It is washed with 1.2-dichlorobenzene at 80°, then with hot alcohol and again with hot water, and finally dried.

From this product a pigment dyestuff preparation can be obtained in the manner described in Example 1. It dyes viscose spinning solutions in reddish violet shades.

EXAMPLE 7

13.6 parts of 1.4-diamino-2-chloroanthraquinone in 240 parts of nitrobenzene are heated to 140° and dehydrated by means of a dry air current. The solution, at 110°, is drop-fed over a period of 2 hours with a solution of 5.1 parts of benzene-1.4-dicarboxylic acid chloride in 24 parts of nitrobenzene. The reaction mass is stirred for 2 hours at 110–115° and subsequently heated at 130° for 1 hour. Then, at 100°, 100 parts of alcohol are added dropwise, whereupon the condensation product is filtered off at 70°, washed with hot alcohol and again with hot water, and dried. The pigment dyestuff obtained from it dyes viscose in the spinning mass in red-violet shades.

A linseed oil paint is prepared as follows: 20 parts of zinc white, 18 parts of boiled linseed oil and 0.2 part of the above-described dyestuff are ground together in a Hoover automatic miller over 400 revolutions. After every 100 revolutions the resulting paste is scraped off the two glass plates with a spatula and deposited at the center of the rotating plate. When ground to the desired consistency, a suitable siccative is mixed with the paste by hand. The finished paste is applied to good-quality typewriter paper (so-called India paper) with a spatula at a thickness sufficient to cover the white ground. A red-violet linseed oil coating is obtained.

EXAMPLE 8

26.8 parts of 1.4-diamino-2-methoxyanthraquinone in 660 parts of 1.2-dichlorobenzene at 140° are dehydrated with a dry air current. 13.8 parts of dimethylaminobenzene are run into the solution at 50°, and a solution of 10.15 parts of benzene-1.3-dicarboxylic acid chloride in 26 parts of 1.2-dichlorobenzene is subsequently added by drop feeding over a period of 4 hours. The mass is mechanically stirred overnight at 50° and subsequently for 1 hour at 110–120°. After this time it is heated to 170° in the course of 2 hours and stirred at this temperature for 1 hour. The mass is then allowed to cool to 70°, whereupon the condensation product is filtered off, washed successively with warm 1.2-dichlorobenzene, warm alcohol and warm water, and finally dried. It dissolves in sulfuric acid with a red coloration. On appropriate treatment it is obtained as a pigment dyestuff preparation which dyes viscose in the spinning solution in bordeaux shades.

EXAMPLE 9

19.6 parts of 1.4-diamino-2-(4'-methyl)-phenylsulfonylanthraquinone in 385 parts of chlorobenzene are heated to the boil. The solution is dehydrated by distilling off 50 parts of a chlorobenzene-water mixture, after which 5 parts of pyridine are added to it at 110°. A solution of 5.1 parts of benzene-1.3-dicarboxylic acid chloride in 20 parts of chlorobenzene is then added dropwise in the course of 2 hours and the reaction mass stirred at 110° until the starting material is no longer indicated. Subsequently, 80 parts of ethyl alcohol are dropped into the mass at 100°. The condensation product is filtered off, washed with hot ethyl alcohol and then with hot water, and finally dried.

10 parts of the condensation product obtained according to the present example are re-precipitated from sulfuric acid, filtered off, washed and dried. The violet dyestuff powder is ground with 10 parts of secondary cellulose acetate and 160 parts of acetone in a ball mill to the requisite degree of fineness. The resulting suspension is poured into water and the product filtered off, washed and dried. The dyestuff obtained thus dyes cellulose acetate in the spinning mass in bluish violet shades.

The 1.4 - diamino-2-(4'-methyl)-phenylsulfonylanthraquinone used as starting material was prepared by condensing an alkali metal salt of the 1.4-diaminoanthraquinone-2-sulfonic acid with 4-methylphenylthiol in presence of sodium or potassium hydroxide at temperatures of between 150 and 200° and oxidizing the 1.4-diamino-2-(4'-methyl)-phenylthioanthraquinone thus obtained.

EXAMPLE 10

31.7 parts of 1.4-diamino-2-bromoanthraquinone and 8.3 parts of benzene-1.3-dicarboxylic acid in 600 parts of nitrobenzene are dehydrated by means of a current of dry air at 140°. The resulting solution at 110° is drop-fed with a solution of 14 parts of thionyl chloride in the course of about 2 hours. The mass is stirred at 110–120° until the reaction is completed. The condensation product, upon processing in the normal manner, is identical with that of Example 5.

EXAMPLE 11

15.45 parts of 1.4-diamino-2-bromo-6.7-dichloroanthraquinone in 300 parts of nitrobenzene at 140° are dehydrated with a dry air current. The resulting solution is drop-fed at 110° over 2 hours with a solution of 4.0 parts of benzene-1.3-dicarboxylic acid chloride in 12 parts of nitrobenzene. The mass is stirred for 1 hour at 110°, then the temperature is raised to 130° and stirring continued until the starting material is no longer indicated. 100 parts of alcohol are added at 100°; the condensation product is filtered off at 70°, washed with hot alcohol and again with hot water, and dried. A pigment dyestuff preparation is obtained from it which dyes viscose in the spinning solution in violet shades.

EXAMPLE 12

When the 15.45 parts of 1.4-diamino-2-bromo-6.7-dichloroanthraquinone employed in Example 11 are replaced by an equivalent quantity of 1.4-diamino-2-bromo-6-chloroanthraquinone a similar pigment dyestuff is obtained.

In the following table further N-monoacyl-1.4-diaminoanthraquinones which can be produced in accordance with one of the foregoing examples are enumerated. In the table the pigment dyestuffs are distinguished by their respective starting products: 1.4-diaminoanthraquinones in column A and the saturated or unsaturated aliphatic or the mono- or binuclear aromatic dicarboxylic acid halides in column B. In column C the shades given by the pigment dyestuffs when applied in viscose spinning solutions are noted.

*Table*

| Example No. | A | B | C |
|---|---|---|---|
| 13 | 1.4-Diamino-2-chloroanthraquinone. | Adipic acid dichloride. | bordeaux. |
| 14 | do | Benzene-1.3-dicarboxylic acid chloride. | violet. |
| 15 | 1.4-Diamino-2-bromoanthraquinone. | Succinic acid dichloride. | red-violet. |
| 16 | do | Adipic acid dichloride. | bordeaux. |
| 17 | do | Sebacic acid dichloride. | Do. |
| 18 | do | 1,1-Azobenzene-4.4'-dicarboxylic acid chloride. | red-brown. |
| 19 | 1.4-Diamino-2-methoxyanthraquinone. | Oxalic acid dichloride. | reddish bordeaux. |
| 20 | do | Fumaric acid dichloride. | bordeaux. |
| 21 | do | Benzene-1.4-dicarboxylic acid chloride. | reddish bordeaux. |
| 22 | 1.4-Diamino-2-ethoxyanthraquinone. | Benzene-1.3-dicarboxylic acid chloride. | bordeaux. |
| 23 | 1.4-Diamino-2n-propoxyanthraquinone. | do | red-violet. |
| 24 | 1.4-Diamino-2-phenoxyanthraquinone. | do | bordeaux. |
| 25 | 1.4-Diamino-2-(4' methyl)-phenylsulfonyl anthraquinone. | Oxalic acid dichloride. | blue-violet. |
| 26 | do | Fumaric acid dichloride. | violet. |
| 27 | do | Benzene-1.4-dicarboxylic acid chloride. | Do. |
| 28 | 1.4-Diamino-6.7-dichloroanthraquinone. | do | Do. |
| 29 | 1.4-Diamino-2-bromo-6.7-dichloroanthraquinone. | do | Do. |
| 30 | 1.4-Diamino-2-bromo-6-fluoroanthraquinone. | do | Do. |
| 31 | 1.4-Diamino-2-bromo-7-chloroanthraquinone. | Benzene-1.3-dicarboxylic acid chloride. | Do. |
| 32 | 1.4-Diamino-2.6-dibromoanthraquinone. | Adipic acid dichloride. | reddish violet. |
| 33 | 1.4-Diamino-6-fluoroanthraquinone. | do | Do. |
| 34 | 1.4-Diamino-2-bromoanthraquinone. | Muconic acid dichloride. | bordeaux. |
| 35 | do | Malonic acid dichloride. | Do. |
| 36 | Mixture of 1.4-diamino-2-bromoanthraquinone and 1.4-diamino-2-chloroanthraquinone. | Benzene-1.3-dicarboxylic acid chloride. | violet. |
| 37 | Mixture of 1.4-diamino-2-bromoanthraquinone and 1.4-diamino-2-methoxyanthraquinone. | Benzene-1.4-dicarboxylic acid chloride. | violet to bordeaux. |
| 38 | do | Adipic acid dichloride. | bordeaux. |

The formulae of such pigment dyestuffs described in the foregoing examples are:

EXAMPLE 1

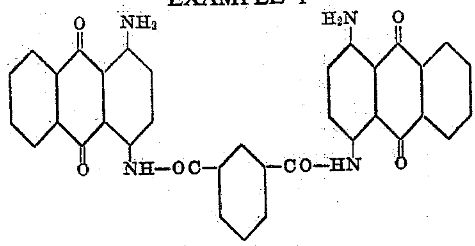

EXAMPLE 2

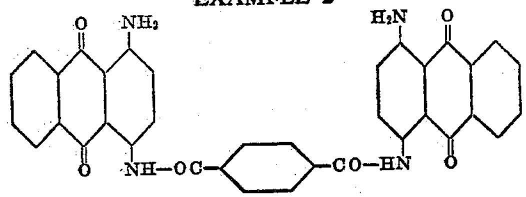

EXAMPLE 3

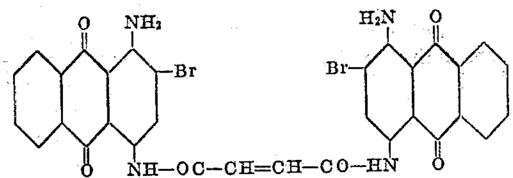

EXAMPLE 4

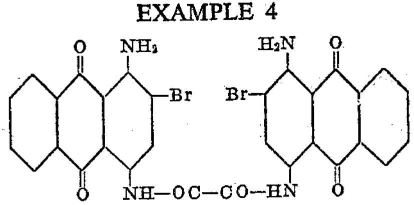

EXAMPLES 5 and 10

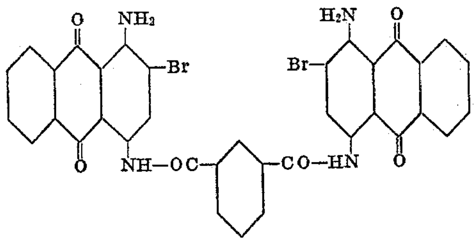

EXAMPLE 6

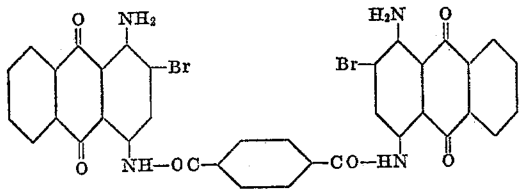

EXAMPLE 7

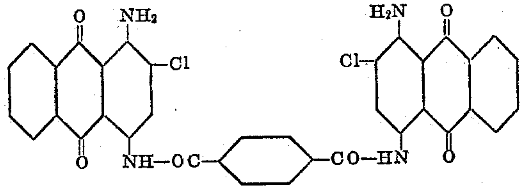

EXAMPLE 8

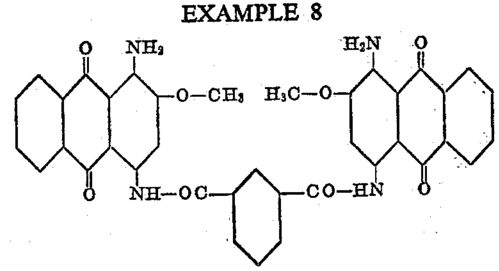

EXAMPLE 9

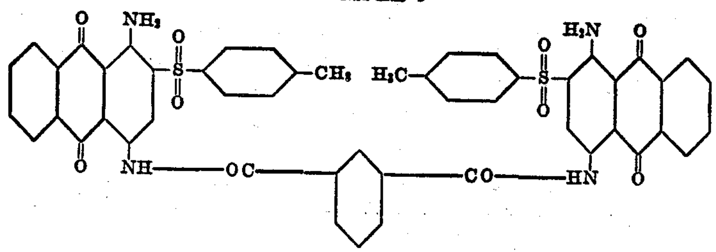

EXAMPLE 11

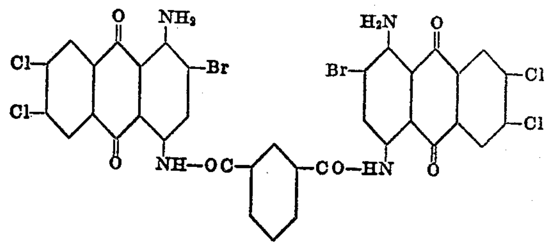

EXAMPLE 12

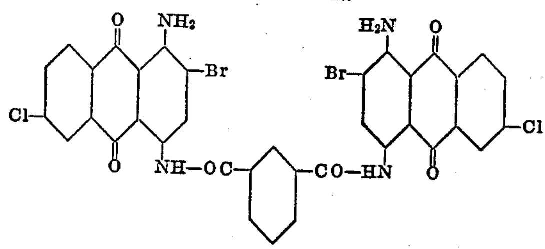

EXAMPLE 16

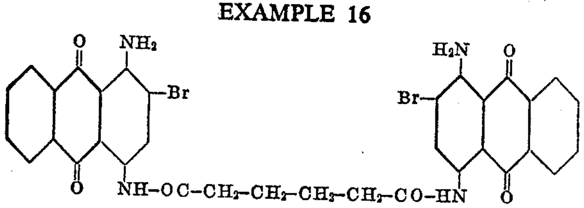

Having thus disclosed the invention what is claimed is:

1. A pigment dyestuff of the anthraquinone series which corresponds to the formula

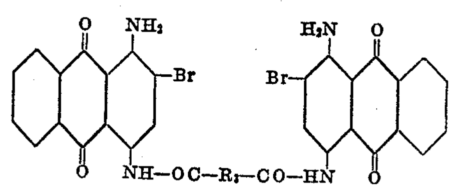

wherein $R_3$ stands for a member selected from the group consisting of the single carbon linkage, the bivalent methylene radical, a bivalent tetramethylene radical and a bivalent phenylene radical.

2. The pigment dyestuff of the anthraquinone series which corresponds to the formula

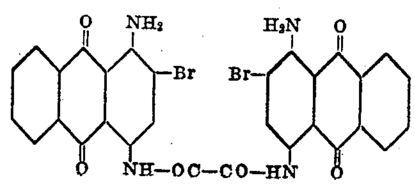

3. The pigment dyestuff of the anthraquinone series which corresponds to the formula

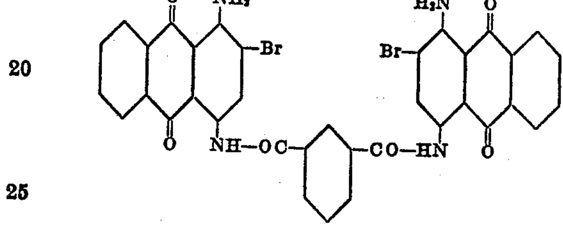

4. The pigment dyestuff of the anthraquinone series which corresponds to the formula

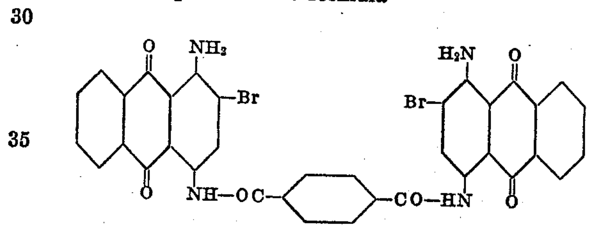

5. The pigment dyestuff of the anthraquinone series which corresponds to the formula

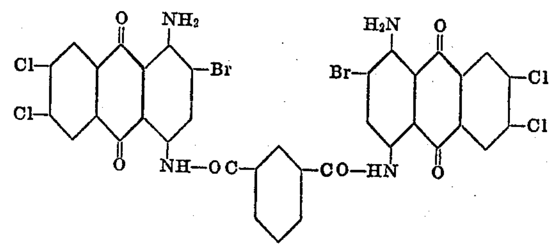

6. The pigment dyestuff of the anthraquinone series which corresponds to the formula

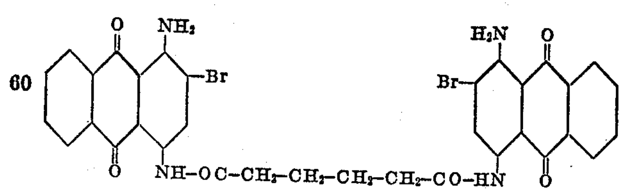

7. A pigment dyestuff of the anthraquinone series which corresponds to the formula

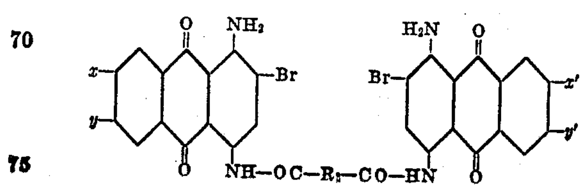

wherein each of $x$ and $x'$ and each of $y$ and $y'$ stands for a member selected from the group consisting of H and Cl, and $R_3$ stands for a member selected from the group consisting of the single carbon linkage, the bivalent methylene radical, a bivalent tetramethylene radical and a bivalent phenylene radical.

References Cited in the file of this patent

UNITED STATES PATENTS

| | | |
|---|---|---|
| 2,510,088 | Dickey et al. | June 6, 1950 |
| 2,614,109 | Jenney et al. | Oct. 14, 1952 |

FOREIGN PATENTS

| | | |
|---|---|---|
| 292,690 | Switzerland | Aug. 15, 1953 |
| 658,722 | Great Britain | Oct. 10, 1951 |
| 857,995 | Germany | Oct. 9, 1952 |